US005250281A

United States Patent [19]

Imai et al.

[11] Patent Number: 5,250,281

[45] Date of Patent: Oct. 5, 1993

[54] PROCESS FOR MANUFACTURING A VOLTAGE NON-LINEAR RESISTOR AND A ZINC OXIDE MATERIAL TO BE USED THEREFOR

[75] Inventors: Osamu Imai, Kasugai; Ritsu Sato, Iwakura, both of Japan

[73] Assignee: NGK Insulators, Ltd., Japan

[21] Appl. No.: 796,367

[22] Filed: Nov. 22, 1991

Related U.S. Application Data

[62] Division of Ser. No. 551,151, Jul. 11, 1990.

[30] Foreign Application Priority Data

Jul. 11, 1989 [JP] Japan ................................ 1-177071
Mar. 16, 1990 [JP] Japan ................................ 2-64432

[51] Int. Cl.[5] .......................... C01G 9/02; C01G 9/03
[52] U.S. Cl. .................................... 423/623; 423/622
[58] Field of Search ................................ 423/622, 623

[56] References Cited

U.S. PATENT DOCUMENTS

| | | | |
|---|---|---|---|
| 2,844,436 | 7/1958 | Baker et al. | 423/622 |
| 3,467,497 | 9/1969 | Weisbeck et al. | 423/623 |
| 3,725,836 | 4/1973 | Wada et al. | 252/518 |
| 3,788,997 | 1/1974 | Mackenzie | 252/518 |
| 4,272,411 | 6/1981 | Sokoly et al. | 252/518 |
| 4,443,361 | 4/1984 | Hierholzer, Jr. et al. | 252/518 |
| 4,451,391 | 5/1984 | Marinace | 252/512 |
| 4,543,341 | 9/1985 | Barringer et al. | 423/622 |
| 4,647,404 | 3/1987 | Morimoto et al. | 252/158 |
| 4,724,416 | 2/1988 | Nakata et al. | 252/518 |
| 4,920,328 | 4/1990 | Hayashi et al. | 252/519 |
| 5,000,876 | 3/1991 | Nemoto et al. | 252/518 |

FOREIGN PATENT DOCUMENTS

| | | |
|---|---|---|
| 0029749 | 6/1981 | European Pat. Off. . |
| 0195911 | 10/1986 | European Pat. Off. . |
| 56-115503 | 9/1981 | Japan . |
| 57-188803 | 11/1982 | Japan . |
| 58-180003 | 10/1983 | Japan . |
| 63-296307 | 12/1988 | Japan . |
| 1-222404 | 9/1989 | Japan . |

*Primary Examiner*—Mark L. Bell
*Assistant Examiner*—C. M. Bonner
*Attorney, Agent, or Firm*—Parkhurst, Wendel & Rossi

[57] ABSTRACT

A voltage non-linear resistor element mainly comprising ZnO, substantially free from internal defects, exhibiting an excellent current impulse withstand capability, can be manufactured by a process wherein an SiC inclusion in the starting ZnO powder is restricted to at most 10 ppm, preferably at most 0.1 ppm, by weight, whereby formation of closed pores in the element is prevented, which is otherwise caused by decomposition of considerable amount of SiC during firing. The starting ZnO powder has an average particle diameter (R) of 0.1–2.0 μm, preferably 0.3–0.8 μm, a particle size distribution within the range of between 0.5R and 2R, of at least 70%, preferably 80%, by weight, needle-like crystals of at most 20%, preferably at most 10%, by weight, and an SiC content as an impurity of at most 10 ppm, preferably at most 0.1 ppm, by weight.

4 Claims, 2 Drawing Sheets

PROCESS FOR MANUFACTURING A VOLTAGE NON-LINEAR RESISTOR AND A ZINC OXIDE MATERIAL TO BE USED THEREFOR

This is a division of application Ser. No. 07/551,151 filed Jul. 11, 1990.

BACKGROUND OF THE INVENTION

1. Field of the Invention

The present invention relates to a process for manufacturing a voltage non-linear resistor comprising zinc oxide as a main ingredient, and to a zinc oxide material which can be suitably used therefor.

2. Related Art Statement

Heretofore, there have been widely known resistors comprising zinc oxide (ZnO) as a main ingredient, and small amounts of additives, such as $Bi_2O_3$, $Sb_2O_3$, $SiO_2$, $Co_2O_3$, $MnO_2$ and the like, as an auxiliary ingredient, which exhibit an excellent voltage non-linear characteristic. Utilizing such a characteristic, these resistors have been used in lightning arresters, etc.

It has been known that in such voltage non-linear resistors mainly comprising zinc oxide, a current impulse withstand capability may be improved by decreasing internal defects of the fired bodies, so that studies of forming and firing conditions have been carried out or an attempt to remove foreign matter has been made by passing slurries through a sieve, prior to granulation, as described in Japanese Patent Application Laid-open No. 56-115,503.

However, the above-described, conventional processes for decreasing internal defects have presented problems such that satisfactory effects cannot be obtained due to insufficient decrease of the internal defects so that a current impulse withstand capability, such as a lightning current impulse withstand capability, switching current impulse withstand capability or the like, cannot be satisfactorily improved.

SUMMARY OF THE INVENTION

We, the inventors, have ascertained that the internal defects of the resistor elements are largely attributable to SiC included as an impurity in starting material compositions,,particularly, formation of the internal defects may be promoted depending on the properties of the zinc oxide starting material occupying about 90 wt. % in the elements. Further, it has been found that if voltage non-linear resistors are manufactured using a starting material composition having an SiC content decreased to a specified value or less, or using zinc oxide particles having a predetermined particle size and its specified distribution, a predetermined crystalline form and a predetermined impurity content, particularly SiC content, the resulting voltage non-linear resistors can-sufficiently decrease internal defects, improving uniformity, and possess a good current impulse withstand capability. Thus, the present invention has been accomplished.

An object of the present invention is to provide voltage non-linear resistors with a good current impulse withstand capability.

Another object of the present invention is to provide zinc oxide starting materials adapted for providing voltage non-linear resistors with decreased internal defects, an improved uniformity of the elements, and a good current impulse withstand capability.

The above objects can be attained by a process for manufacturing a voltage non-linear resistor element through a step of firing a mixture comprising zinc oxide powder as a main ingredient, and additives as an auxiliary ingredient comprising bismuth oxides and antimony oxides, or praseodymium oxides, at a temperature of 1,000° C. or more, in which process said mixture contains SiC as an impurity in an amount restricted to not more than 10 ppm, preferably not more than 0.1 ppm, by weight.

Furthermore, the zinc oxide powder employed in the above process according to the present invention, preferably has an average particle diameter R of 0.1-2.0 $\mu$m, a particle size distribution within the range of between 0.5R and 2R, of at least 70% by weight, needle-like crystals of at most 20% by weight, and an SiC content as an impurity of at most 10 ppm, preferably at most 0.1 ppm, by weight.

More particularly, the starting material composition for the voltage non-linear resistor elements, to be applied to the process according to the present invention, in view of characteristics of the resulting elements, such as a discharge voltage, lightning current impulse withstand capability, switching current impulse withstand capability, life under electrical stress or the like, is preferred to comprise a mixture comprising zinc oxide as a main ingredient, and additives as an auxiliary ingredient of a small quantity, which additives, in the case of bismuth oxide based composition, comprise 0.5–10.0%, preferably 3.0–6.0%, by weight of bismuth oxides calculated as $Bi_2O_3$;

0.3–8.0%, preferably 1.0–5.0%, by weight of antimony oxides calculated as $Sb_2O_3$;

0.1–2.0%, preferably 0.2–1.0% by mole of cobalt oxides calculated as $Co_3O_4$;

0.1–2.0%, preferably 0.3–0.8% by mole of manganese oxides calculated as $MnO_2$;

0.1–2.0%, preferably 0.2–1.0% by mole of chromium oxides calculated as $Cr_2O_3$;

0.1–2.0%, preferably 0.5–1.5% by mo silicon oxides calculated as $SiO_2$;

0.1–2.0%, preferably 0.5–1.5% by mole of nickel oxides calculated as NiO;

0.001–0.1%, preferably 0.001–0.01% by mole of boron oxides calculated as $B_2O_3$;

0.001–0.05%, preferably 0.002–0.02% by mole of aluminium oxides calculated as $Al_2O_3$; and 0.001–0.1%, preferably 0.002–0.02% by mole of silver oxides calculated as $Ag_2O$.

Alternatively, in the case of praseodymium oxide based composition, the additives, also in view of the above characteristics of the resulting elements, are preferred to comprise:

0.01–3.0%, preferably 0.05–1.0%, by weight of praseodymium oxides calculated as $Pr_6O_{11}$;

0.1–5.0%, preferably 0.5–2.0%, by mole of cobalt oxides calculated as Co304; and 0 001–0.05%, preferably 0.002–0.02%, by mole of aluminium oxides calculated as $Al_2O_3$.

Conventional greenwares for voltage non-linear resistor elements, mainly comprising zinc oxide, have usually contained a considerable amount of SiC in the composition as an impurity contained in starting materials or brought in from materials of equipments or apparatuses during manufacturing processes. However, the inventors have elucidated that SiC included in the mixture is decomposed during firing, and the decomposed gas forms closed pores at 1,000° C. or more, causing internal defects. Namely, as will be clear from Examples described hereinafter, internal defects such as pores, voids or the like in the elements can be reduced sufficiently to obtain a good current impulse withstand capability, by restricting the SiC content in the composition to at most 10 ppm, preferably at most 0.1 ppm, by weight, while if the SiC content exceeds 10 ppm by weight, the resulting-voltage non-linear resistor elements will be extremely deteriorated both in the lightning current impulse withstand capability and switching current impulse withstand capability.

"Further, when the additives as an auxiliary ingredient for the zinc oxide elements comprise bismuth oxides in an amount of 0.5% or more, antimony oxides in an amount of 0.3% or more, or praseodymium in an amount of 0.01% or more, by weight, a decomposition reaction of SiC will be so facilitated that the decomposed gas becomes liable to form closed pores which affect badly the characteristics of the zinc oxide elements. Furthermore, in the case where the additives comprise bismuth oxides in an amount of 2% or more, antimony oxides in an amount of 1.5% or more, or praseodymium in an amount of 0.05% or more, by weight, the decomposition reaction of SiC will be further facilitated to affect greatly the characteristics of the zinc oxide elements. Therefore, the reduction of the SiC content into the aforementioned range allows the amounts of the necessary auxiliary ingredients, such as bismuth oxides, antimony oxides or praseodymium oxides, to increase with substantially no drawbacks being attended.

Accordingly, to keep the SiC content in the zinc oxide starting material below a specified level is extremely important for providing zinc oxide elements with uniformity and excellent characteristics.

The SiC is mostly introduced from ZnO starting materials into the mixture. In view of the above, as a means of preventing inclusion of SiC, there may be taken measures such that: (1) dissolving baths made of $Al_2O_3$ or refractory materials other than SiC should be employed in the manufacturing process of ZnO starting materials; (2) the dissolving baths are provided with a dam plate to prevent sludges (containing SiC) floating on the surface of the solution from flowing out into the subsequent step; (3) ZnO obtained from the tank at the downstream extremity of collecting tanks arranged in series is sued as a starting material (the tank at the downstream extremity includes the least SiC); or the like. Additionally, passing slurries through a sieve which has been generally used as a measure for preventing incorporation of foreign matter, is not so effective as a measure for preventing SiC inclusion.

The zinc oxide starting material powder to be applied to the process of the present invention has an average particle diameter R of 0.1–2.0 μm, preferably 0.3–0.8 μm, with a particle size distribution falling within the range between 0.5R and 2R of at least 70%, preferably at least 80%, by weight. An average particle diameter R exceeding 2.0 μm will retard progress of firing and facilitate formation of internal defects. In this case, an attempt to promote the firing by raising the temperature should be avoided, because such a high temperature will also promote decomposition of SiC. Alternatively, an average particle diameter R of less than 0.1 μm is not preferred, because the zinc oxide starting materials are prone to adsorb moisture and carbon dioxide gas in air and are converted to a basic zinc carbonate; $2ZnCO_3.3Zn(OH)_2.H_2O$, during storage.

Further, by leveling the particle diameter to such an extent that at least 70%, preferably at least 80%, by weight of particle size distribution, falls within the range of ½–2 times the average particle diameter R, grain growth of zinc oxide particles is uniformly performed during firing of zinc oxide elements and thus internal defects, such as, pores, voids or the like, decrease.

The zinc oxide is generally manufactured by oxidization of zinc. Its crystal system is predominantly hexagonal, with a bulky or plate-like form. However, needle-like crystals are also produced depending on manufacturing conditions, which are included in the zinc oxide starting materials. Reduction of such needle-like crystals to 20% or less by weight, preferably 10% or less by weight, will allow a further effective prevention of an abnormal grain growth of zinc oxide particles during firing, which otherwise causes deterioration of characteristics of voltage non-linear resistors. If the zinc oxide grain grows abnormally, the elements will be largely deteriorated in uniformity as well as current impuse withstand capability.

BRIEF DESCRIPTION OF THE DRAWINGS

The present invention will be further explained in more detail with reference to the appended drawings, wherein.

DESCRIPTION OF THE PREFERRED EMBODIMENTS

Figure 1:
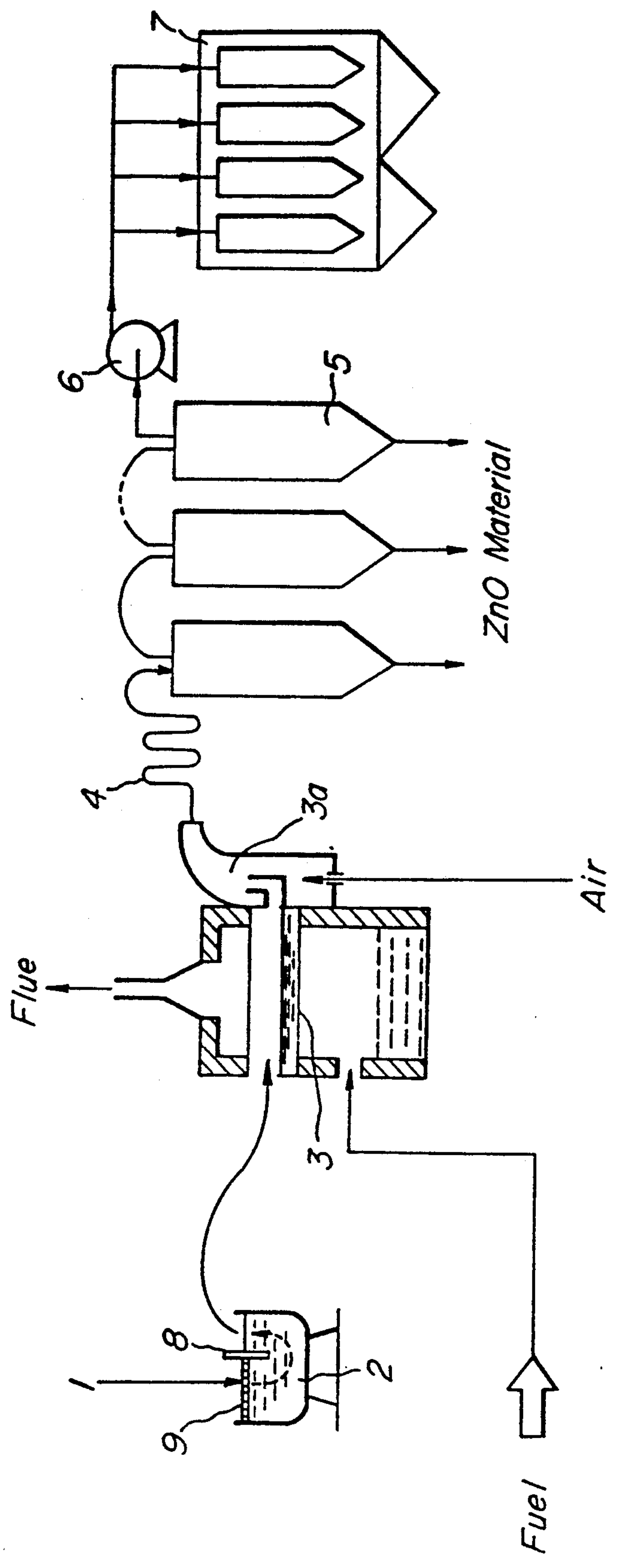
FIG. 1 is a diagrammatic view showing an embodiment of an apparatus for conducting the so-called "French Process" for manufacturing the zinc oxide starting materials of the present invention.

Referring to FIG. 1, the numeral 1 is a starting material metallic zinc, the numeral 2 is a smelting furnace provided with a dissolving bath made of SiC, for smelting the metallic zinc 1, the numeral 3 is a retort furnace for conducting an oxidation reaction, the numeral 4 is a cooling duct, the numeral 5 is a collecting tank, the numeral 6 is an air blower and the numeral 7 is a bag filter. In the equipment having the above-described structure, the metallic zinc molten in the smelting furnace 2 is charged into the retort furnace 3 and heated at about 1,100°–1,400° C. from outside. When the zinc in the retort furnace 3 reaches its boiling point (about 900° C.), it spouts out of an evaporation orifice, and then oxidized by combustion in an oxidizing chamber 3a within the retort furnace 3. The high temperature zinc oxide obtained by the combustion-oxidation in the oxidizing chamber 3a is sucked by a suction force of the air blower 6 and cooled down during passing through the cooling duct 4. Then, zinc oxide powder can be obtained mostly in the collecting tank 5 and partly in the bag filter 7.

In the equipment shown in FIG. 1, the SiC content in the obtained ZnO starting powder can be decreased by the following means:

(1) The hitherto employed SiC as a material for the smelting furnace 2, is substituted with another refractory material such as $Al_2O_3$ or the like. As a material for the smelting furnace, an SiC refractory material with a high thermal shock resistance has been generally used. However, there has arisen a problem of inclusion of the SiC material in the sludge and molten metallic zinc, due to chemical corrosion, mechanical shock and the like, which flows into the retort furnace 3. The above means can effectively solve this problem.

(2) The dissolving bath in the smelting furnace 2 is provided with a dam plate 8 on the liquid level to prevent the sludge 9 from flowing into the retort furnace 3.

(3) The retort furnace is built with a material not containing SiC, such as alumina or the like.

(4) By suppressing the bumping of the molten zinc in the retort furnace 3, SiC fine particles are prevented from flowing into the collecting tanks 5, which otherwise flow in, entrained by zinc vapor stream. In order to effectuate the above, the temperature to heat the retort furnace 3 is controlled so that the evaporation rate may be 5–10 tons/day for the evaporation area of 1,500 mm × 1,500 mm, the air flowing into the retort furnace 3 for oxidizing the zinc vapor is controlled at a rate of 50–100 $m^3$/min., the temperature at the outlet of the oxidizing chamber 3a is controlled at 350°–450° C., and the cooling rate from the zinc oxide producing step down to 400° C. is controlled to be at most 400° C./sec, preferably at most 200° C./sec.

(5) ZnO powder obtained from the tank at the downstream extremity of collecting tanks 5 arranged in series is used as a starting material, because the tank at the downstream extremity includes the least SiC.

In addition to the above, it is needless to say that SiC contents included in other additives should be controlled precisely.

The zinc oxide starting materials obtained under the above-described conditions not only have a specified amount or less of SiC inclusion but also are specified in particle size and its distribution as well as crystal form. Additionally, in order to reduce needle-like crystals, particularly important is to cool slowly the high temperature zinc oxide down to 400° C., as described above.

In order to obtain voltage non-linear resistors from the starting material mainly comprising zinc oxide, specified in average particle diameter and its distribution, a crystal form and SiC content, according to the process of the present invention, on the outset, a zinc oxide starting material having a predetermined average particle diameter of 0.1–2.0 μm is admixed with a predetermined amounts of fine particle additives having a predetermined average particle diameter of not exceeding 2 μm, comprising bismuth oxides, cobalt oxides, manganese oxides, antimony oxides, chromium oxides, silicon oxides preferably amorphous, nickel oxides, boron oxides, silver oxides or the like, using a ball mill or dispersion mill. Alternatively, in this case, silver nitrate and boric acid may be used in lieu of silver oxides and boron oxides, respectively. A bismuth boronsilicate glass containing silver may be preferably used. Furthermore, instead of the above additives, there also may be used praseodymium oxides, cobalt oxides, bismuth oxides, manganese oxides, chromium oxides or the like, having an average particle diameter adjusted to a predetermined value of not exceeding 2 μm. As these auxiliary ingredient starting material additives, it is desired to use a powder as fine as not exceeding 2 μm, preferably not exceeding 0.5 μm so that sintering can be conducted at a low temperature as possible. These starting material powders are admixed with predetermined amounts of polyvinyl alcohol aqueous solution and alminium nitrate solution as an alminium oxide source, to prepare a mixture.

In the present invention, what is important is to use a mixture having an SiC content on this stage of 10 ppm or less by weight based on the mixture in the undermentioned manufacturing process.

Then, a mixed slip is obtained through deaeration at a vacuum degree of preferably not exceeding 200 mmHg. It is preferred to attain a water content of about 30–35% by weight and a viscosity of 100±50 cp, of the mixed slip. Then, the obtained mixed slip is fed into a spray-drying apparatus to granulate into granules having an average particle diameter of 50–150 μm, preferably 80–120 μm, and a water content of 0.5–2.0%, preferably 0.9–1.5%, by weight. The obtained granules are formed into a predetermined shape under a pressure of 800–7,000 kg/$cm^2$ at the forming step. The forming may be conducted by means of hydrostatic press, the usual mechanical press or the like.

The formed body is provisionally calcined under conditions of heating and cooling rates of not more than 100° C./hr. and a retention time at 800°–1,000° C., of 1–5 hours. Additionally, it is preferred to remove binders or the like prior to the provisional calcination, at heating and cooling rates of not more than 100° C./hr. and a retention time at 400°–600° C., of 1–10 hours.

Then, an electric insulating covering layer is formed on the side surface of the provisional calcined body. In this invention, a mixed slip for insulating cover comprising predetermined amounts of $Bi_2O_3$, $Sb_2O_3$, ZnO, $SiO_2$ and the like admixed with ethyl cellulose, butyl carbitol, n-butyl acetate or the like as an organic binder is applied to form a layer 60–300 μm thick on the side surface of the provisional calcined body. Then, the composite body is sintered under conditions of heating and cooling rates of 20°–60° C./hr. and a retention time at 1,000°–1,300° C., preferably 1,050°–1,250° C., of 3–7 hours. Additionally, it is preferred that a glass paste comprising glass powder admixed with ethyl cellulose, butyl carbitol, n-butyl acetate or the like as an organic binder, is applied with a thickness of 100–300 μm onto the above insulating covering layer and then heat-treated in air under conditions of heating and cooling rates of 50°–200° C./hr. and a temperature retention time at 400°–800° C., of 0.5–10 hours, more preferably a retention time at 500°–650° C., of 2–5 hours.

Then, both the end surfaces of the obtained voltage non-linear resistor are polished with a #400~2,000-grit abrasive, such as SiC, $Al_2O_3$, diamond or the like, using water, preferably oil, as an abrasive liquid. Then after cleaning, both the polished surfaces are provided with electrodes, such as alminium or the like, by means of, for example, metallizing.

With respect to voltage non-linear resistors respectively inside and outside the scope of the invention, the results of measurement on various characteristics will be explained hereinafter.

EXAMPLE 1

In accordance with the above-described process, voltage non-linear resistor specimens Nos. 1–6 of the present invention and Nos. 1–2 of comparative examples, having a shape of 47 mm diameter and 20 mm thickness and a varistor voltage ($V_{1mA}$) of 200 V/mm, as shown in Table 1 were prepared from starting materials comprising each 0.1–2.0 mol % of $Co_3O_4$, $MnO_2$, $Cr_2O_3$, NiO and $SiO_2$, 0.1 wt. % of bismuth boronsilicate glass containing silver, 4.5 wt. % of $Bi_2O_3$, 3.0 wt. % of $Sb_2O_3$ and the remainder being ZnO, and containing SiC in various amounts as shown in Table 1.

The prepared resistors of the present invention and the comparative examples were measured for a defect formation ratio of sintered body (%), a switching current impulse withstand capability in fracture ratio (%) and a lightning current impulse withstand capability in fracture ratio (%). The results are shown in Table 1. The defect formation ratio of sintered body was determined, as a ratio of resistors having a defect of at least 0.5 mm diameter, by an ultrasonic flaw detecting test. The switching current impulse withstand capability in fracture ratio was determined, as a ratio of resistors fractured after 20 times repeated applications of a current of 800 A, 900 A or 1,000 A with a waveform of 2 ms. The lightning current impulse withstand capability in fracture ratio was determined, as a ratio of fractured resistor, after 2 times repeated applications of a current of 100 KA, 120 KA or 140 KA with a waveform of 4/10 μs.

Furthermore, the SiC content was determined by a quantitative analysis with fluorescent X-ray, of an insoluble residue of the starting material, obtained after dissolving the starting material with an acid, alkali or the like, followed by filtering and washing.

TABLE 1

| Run No. | SiC content (wt. ppm) | Defect formation ratio of sintered body (%) | Switching current impulse withstand capability in fracture ratio (%) | | | Lightning current impulse withstand capability in fracture ratio (%) | | |
|---|---|---|---|---|---|---|---|---|
| | | | 800A | 900A | 1000A | 100KA | 120KA | 140KA |
| Present invention | | | | | | | | |
| 1 | 10 | 9 | 0 | 0 | 25 | 0 | 0 | 20 |
| 2 | 6 | 6 | 0 | 0 | 20 | 0 | 0 | 15 |
| 3 | 0.4 | 3 | 0 | 0 | 15 | 0 | 0 | 5 |
| 4 | 0.1 | 1 | 0 | 0 | 0 | 0 | 0 | 0 |
| 5 | 0.05 | 1 | 0 | 0 | 5 | 0 | 0 | 0 |
| 6 | 0.01 | 0.5 | 0 | 0 | 0 | 0 | 0 | 0 |
| Comparative Example | | | | | | | | |
| 1 | 40 | 35 | 5 | 35 | 100 | 20 | 50 | 100 |
| 2 | 90 | 41 | 15 | 55 | 100 | 20 | 55 | 100 |

It can be understood from the results shown in Table 1 that the resistors of the present invention manufactured with a starting mixture including a defined SiC content, exhibit good characteristics, as compared with those of comparative examples.

EXAMPLE 2

Various tests were conducted in the same manner as Example 1, except that 0.05 wt. % of $Pr_6O_{11}$, 0.6 mol. % of $Co_3O_4$, 0.005 mol. % of $Al_2O_3$, 0.01-0.1 mol. % of $Bi_2O_3$, 0.01-0.1 mol. % of $MnO_2$ and 0.01-0.1 mol. % of $Cr_2O_3$ were added as an additive, the resistors had a shape of 32 mm diameter and 30 mm thickness, the determination of the switching current impulse withstand capability in fracture ratio was conducted with 300 A, 400 A and 500 A currents, and the determination of the lightning current impulse withstand capability in fracture ratio was conducted with 60 KA, 70 KA and 80 KA currents. The results are shown in Table 2.

TABLE 2

| Run No. | SiC content (wt. ppm) | Defect formation ratio of sintered body (%) | Switching current impulse withstand capability in fracture ratio (%) | | | Lightning current impulse withstand capability in fracture ratio (%) | | |
|---|---|---|---|---|---|---|---|---|
| | | | 300A | 400A | 500A | 60KA | 70KA | 80KA |
| Present invention | | | | | | | | |
| 7 | 10 | 10 | 0 | 0 | 15 | 0 | 0 | 25 |
| 8 | 4 | 8 | 0 | 0 | 10 | 0 | 0 | 15 |
| 9 | 0.1 | 1 | 0 | 0 | 0 | 0 | 0 | 5 |
| 10 | 0.06 | 1 | 0 | 0 | 0 | 0 | 0 | 0 |
| 11 | 0.001 | 0.5 | 0 | 0 | 0 | 0 | 0 | 0 |
| Comparative Example | | | | | | | | |
| 3 | 42 | 33 | 15 | 50 | 95 | 45 | 75 | 100 |
| 4 | 73 | 42 | 25 | 65 | 100 | 50 | 80 | 100 |

It can be understood from the results shown in Table 2 that the resistors of the present invention manufactured with a starting mixture including SiC in an amount of not exceeding the defined value, exhibit good characteristics, as compared with those of the comparative examples.

EXAMPLE 3

In accordance with the above-described process, starting materials comprising each 0.1-2.0 mol. % of $Co_3O_4$, $MnO_2$, $Cr_2O_3$, NiO and $SiO_2$, 0.005 mol. % of $Al(NO_3)_3.9H_2O$, 0.1 wt. % of bismuth borosilicate glass containing silver, 4.5 wt. % of $Bi_2O_3$, 3.0 wt. % of $Sb_2O_3$ and the remainder being ZnO, having an average particle diameter, a particle size distribution, a needle-like crystal ratio and an SiC content as shown in Table 3, were formed into a shape of 47 mm diameter and 20 mm thickness and sintered to prepare voltage non-linear resistor specimens Nos. 12-20 of the present invention and Nos. 5-9 of comparative examples, having a shape of 47 mm diameter and 20 mm thickness and a varistor voltage ($V_{1mA}$) of 200 V/mm, as shown in Table 3.

Figure 2A:
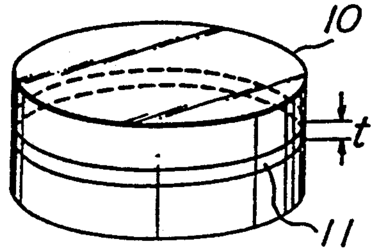
FIGS. 2a–2c are illustrative views showing a method for measuring dispersion of varistor voltage.
Figure 2B:
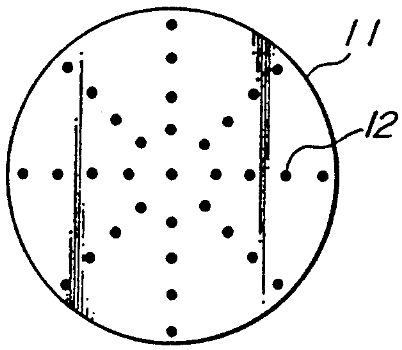
Figure 2C:
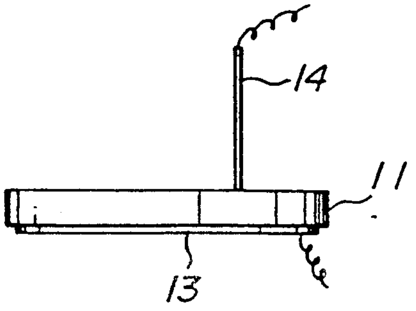

The prepared resistors of the present invention and the comparative examples were measured for a defect formation ratio of sintered body (%), a switching current impulse withstand capability in fracture ratio (%), a lightning current impulse withstand capability in fracture ratio (%) and a dispersion of varistor voltage. The results are shown in Table 3. The defect formation ratio of sintered body was determined, as a ratio of resistors having a defect of at least 0.5 mm diameter, by an ultrasonic flaw detecting test. The switching current impulse withstand capability in fracture ratio was determined, as a ratio of resistors fractured after 20 times repeated applications of a current of 1,200 A or 1,300 A with a waveform of 2 ms. The lightning current impulse withstand capability in fracture ratio was determined, as a ratio of resistors fractured after 2 times repeated applications of a current of 120 KA or 140 KA with a waveform of 4/10 μs. As for the dispersion of varistor voltage, as shown in FIG. 2a, an element 11 with a thickness t of 2 mm was cut out from the middle portion of the resistor 10 and polished to prepare a test-piece, electrodes 13 were attached on the bottom surface as shown in FIG. 2c, and then varistor voltages ($V_{1mA/mm}$) were measured at all of the measuring points 12 shown in FIG. 2b, on the surface, with a 1 mm diameter probe 14. Thus, the dispersion of the measured varistor voltages was found and evaluated.

Further, the SiC content was determined by a quantitative analysis with fluorescent X-ray, of an insoluble residue of the starting material, obtained after dissolving the starting material with an acid, alkali or the like, followed by filtering and washing. Furthermore, the needle-like crystal ratio was found by scanning electromicroscopic (SEM) observation.

As is clear from the above explanation, in accordance with the manufacturing process of voltage non-linear resistors of the present invention wherein the SiC content in the starting material mixture is limited to not exceeding 10 ppm by weight, the internal defects in the sintered body can be decreased and thus voltage non-linear resistors having good lightning current impulse withstand capability and switching current impulse withstand capability, can be obtained. Furthermore, with regard to a life under electrical stress as well as the discharge voltage, good characteristics have been recognized.

Moreover, as regards the zinc oxide starting material according to the present invention, having predetermined average particle diameter and particle size distribution, and meeting required contents of needle-like crystals and SiC, voltage non-linear resistors manufactured therefrom can be provided with further decreased internal defects and an improved uniformity of the elements. Thus, voltage non-linear resistors having good electric characteristics can be obtained.

TABLE 3

| Run No. | Average particle diameter (μm) | Particle size distribution (percentage within 0.5-2 times average particle diameter) | Ratio of needle-like crystal (wt. %) | SiC content (wt. ppm) | Interval defect formation ratio (%) | Switching current impulse withstand capability in fracture ratio (%) | | Lightning current impulse withstand capability in fracture ratio (%) | | Dispersion of varistor voltage ($\sigma_{n-1}$) |
|---|---|---|---|---|---|---|---|---|---|---|
| | | | | | | 1200A | 1300A | 120KA | 140KA | |
| Present invention | | | | | | | | | | |
| 12 | 0.4 | 85 | 8 | $1 \times 10^{-3}$ | 9 | 0 | 25 | 0 | 10 | 2.2 |
| 13 | 1.4 | 83 | 5 | $6 \times 10^{-4}$ | 8 | 0 | 25 | 0 | 10 | 2.1 |
| 14 | 0.4 | 82 | 8 | $1 \times 10^{-5}$ | 2 | 0 | 0 | 0 | 0 | 1.9 |
| 15 | 0.3 | 88 | 20 | $5 \times 10^{-6}$ | 6 | 0 | 20 | 0 | 10 | 2.9 |
| 16 | 0.6 | 71 | 10 | $8 \times 10^{-6}$ | 6 | 0 | 20 | 0 | 5 | 2.4 |
| 17 | 2.0 | 90 | 3 | $9 \times 10^{-6}$ | 5 | 0 | 15 | 0 | 5 | 2.2 |
| 18 | 0.1 | 88 | 4 | $7 \times 10^{-6}$ | 4 | 0 | 15 | 0 | 0 | 2.0 |
| 19 | 0.3 | 80 | 0.5 | $1 \times 10^{-5}$ | 0.5 | 0 | 0 | 0 | 0 | 1.5 |
| 20 | 0.8 | 89 | 3 | $3 \times 10^{-6}$ | 1 | 0 | 0 | 0 | 0 | 1.9 |
| Comparative Example | | | | | | | | | | |
| 5 | 0.05 | 75 | 15 | $5 \times 10^{-4}$ | 20 | 5 | 50 | 30 | 60 | 4.0 |
| 6 | 3.0 | 77 | 13 | $4 \times 10^{-4}$ | 35 | 5 | 95 | 50 | 95 | 5.9 |
| 7 | 0.5 | 65 | 17 | $3 \times 10^{-4}$ | 25 | 5 | 55 | 30 | 65 | 4.5 |
| 8 | 0.4 | 75 | 30 | $5 \times 10^{-4}$ | 20 | 10 | 100 | 45 | 90 | 7.2 |
| 9 | 0.7 | 76 | 10 | $1 \times 10^{-2}$ | 60 | 20 | 100 | 60 | 100 | 3.6 |

It can be understood from the results shown in Table 3 that the resistors Nos. 12-20 of the present invention manufactured from a zinc oxide starting material with defined average particle diameter, particle size distribution and a specified needle-like crystal ratio, including SiC in an amount of not exceeding the specified value, exhibit good characteristics, as compared with those of the comparative examples Nos. 5-9 which do not meet any of the requirements of the present invention.

In the above Example 3, though bismuth oxide based varistors have been described, substantially the same results are obtained with regard to praseodymium oxide based varistors comprising praseodymium oxide substituted for bismuth oxide. As for the manufacturing process of Zinc oxide, though a process of oxidation of metallic zinc has been described, substantially the same results are also obtained with regard to zinc oxide starting materials obtained by a thermal decomposition process of a basic zinc carbonate.

What is claimed is:

1. A zinc oxide powder produced from oxidizing zinc metal for a ZnO-based voltage non-linear resistor, comprising:

an average particle diameter (R) between 0.3 μm and 0.8 μm, wherein at least 70% by weight of said zinc oxide powder has particle diameters within a 0.5 R to 2.0 R particle size distribution, at most 20% by weight of said zinc oxide powder being needle-like crystals, and an SiC content as an impurity of not more than 10 ppm by weight.

2. The zinc oxide powder of claim 1 wherein the SiC content is at most 0.1 ppm by weight.

3. The zinc oxide powder of claim 1 wherein the particle size distribution within the range of between 0.5R and 2R is at least 80% by weight.

4. The zinc oxide powder of claim 1 wherein the needle-like crystals are at most 10% by weight.

* * * * *